(12) United States Patent
Das (10) Patent No.: US 7,743,368 B2
(45) Date of Patent: Jun. 22, 2010

(54) METHOD AND APPARATUS FOR PROVIDING CLASS HIERARCHY INFORMATION FOR FUNCTION DEVIRTUALIZATION

(75) Inventor: Dibyendu Das, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 978 days.

(21) Appl. No.: 11/199,659

(22) Filed: Aug. 9, 2005

(65) Prior Publication Data

US 2007/0038988 A1 Feb. 15, 2007

(51) Int. Cl.
*G06F 9/45* (2006.01)
(52) U.S. Cl. ........................... 717/151; 717/157
(58) Field of Classification Search .................. None
See application file for complete search history.

(56) References Cited

U.S. PATENT DOCUMENTS

| | | | | |
|---|---|---|---|---|
| 5,276,881 A | * | 1/1994 | Chan et al. ................. | 717/147 |
| 6,138,269 A | * | 10/2000 | Ball et al. ................... | 717/108 |
| 6,175,956 B1 | * | 1/2001 | Hicks et al. ................. | 717/114 |
| 6,631,513 B1 | * | 10/2003 | Gil et al. ..................... | 717/116 |
| 6,754,887 B1 | * | 6/2004 | Gil et al. ..................... | 717/116 |
| 7,380,234 B2 | * | 5/2008 | Gil et al. ..................... | 717/108 |
| 2003/0051234 A1 | * | 3/2003 | Schmidt ..................... | 717/158 |

* cited by examiner

*Primary Examiner*—Hyung S Sough
*Assistant Examiner*—Kimberly Jordan (57) ABSTRACT

A class hierarchy graph defining the baseclass-subclass relationship between classes in an object-oriented program is built by analysis of the intermediate representation of the program produced by a compiler front end. This representation includes virtual tables for classes that include virtual functions and type structure information for the classes provided to aid run time type identification (RTTI). The class hierarchy information cannot be identified from the virtual tables alone but can be identified from the type structure information.

11 Claims, 6 Drawing Sheets

METHOD AND APPARATUS FOR PROVIDING CLASS HIERARCHY INFORMATION FOR FUNCTION DEVIRTUALIZATION

FIELD OF THE INVENTION

The present invention relates to compilation and optimisation of computer programs, particularly but not exclusively to providing class hierarchy information for determining whether a virtual function in a program written in an object-oriented language such as C++ is devirtualizable.

BACKGROUND

Figure 1:
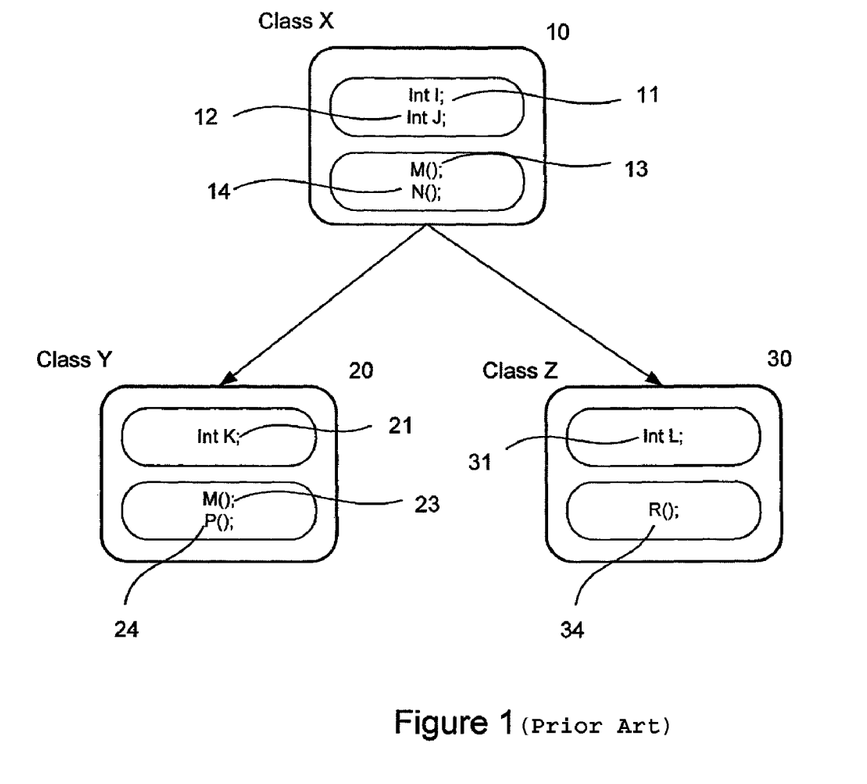
FIG. 1 illustrates a simple class hierarchy for a multi-class program.

Object-oriented languages are well established. Many such languages exist, each having their own syntax. However, the essential concepts underlying these languages are very similar. In general terms, object oriented languages involve the creation of data structures known as objects, which are instances of a particular class or type. A class is associated with instance variables, also referred to as members, as well as methods or functions. A class can have subclasses and/or superclasses, and the resulting structure is referred to as a class hierarchy. For example, FIG. 1 illustrates a simple class hierarchy in which classes Y 20 and Z 30 are subclasses of class X 10. Y and Z can also be referred to as being derived from class X. Class X is referred to as the superclass or baseclass of classes Y and Z.

Class X is shown as defining members I 11 and J 12 and methods M( ) 13 and N( ) 14. Class Y has member K 21 and defines methods M( ) 23 and P( ) 24. Class Z has member L 31 and defines method R( ) 34.

FIG. 1 shows that class Y 20 implements its own version of method M( ). The method M 23 defined in class Y 20 is said to override method M( ) 13 in class X 10. Since the actual method being called (either M( ) 13 or M( ) 23) will depend on the type of the calling object, which will only be determined at run-time, a technique known as dynamic dispatch, the method M( ) is referred to as a virtual function. In the C++ computer language, for example, a method which has several implementations and needs to be selected dynamically is explicitly declared in the baseclass as a virtual function.

Access to virtual functions is generally carried out through data structures known as virtual tables, or vtables, which are created by a compiler. This access carries a significant run-time penalty as compared with direct function calls. This presents a problem since virtual function calls are widely used in languages such as C++ and can therefore significantly affect the performance of programs written in this language.

Function devirtualization is a well-known compiler optimization technique for programs written in languages that make use of virtual functions. This optimization replaces a call to a virtual function by a call to a particular function of a class, so eliminating the overheads of accessing a virtual function via virtual tables. In addition, the direct call may be inlined, giving rise to the possibility of further performance improvements.

Function devirtualization can be understood by reference to Listing 1 below.

Listing 1.

```
class A {
        int i;
    public:
        A( ):i(0){ };
```

-continued

Listing 1.

```
        ~A( ){ };
        virtual int get_val( ) {return i;};
};
class B : public A{
        int j;
    public:
        B( ):j(45){ };
        ~B( ){ };
}
int foo(void)
{
        B b, *bp;
        bp=&b;
        return bp->get_val( );
}
```

In Listing 1, the call to get_val( ) in foo( ) is a call to an object of class B. Since class B is declared to be derived from class A (class B: public A { . . . }), but does not include a method named get_val( ), the call to get_val( ) therefore actually calls the function get_val( ) of class A. Normally, such virtual function calls are executed by using the virtual table pointers. These not only add overhead to the calling mechanism but also block any form of inlining possible at the call point. In this example, the call to get_val( ) can be replaced by a direct call to get_val( ) of class A in the following manner:

return bp→A::get_val( );

However, to devirtualize automatically in a compiler at static time requires knowledge of class hierarchy, namely which subclasses have virtual functions that override those declared in their superclasses/baseclasses. For the example being considered, the call to get_val( ) can be rerouted to a call to A::get_val( ) by noting that class B does not override the virtual method named get_val( ) defined in its baseclass, class A. This analysis is termed the Class Hierarchy Analysis (CHA).

Class Hierarchy Analysis (CHA) is one of the well-known techniques that are applied to find out whether a virtual call is devirtualizable.

The building block of CHA is the Class Hierarchy Graph (CHG). The Class Hierarchy Graph contains nodes, each of which represent a class, and edges, each of which represent a superclass-subclass relationship i.e. if an edge points from node x to node y, then x is the superclass and y the subclass. In addition, each node has a list of virtual functions defined in the class. For the example given in Listing 1, the Class Hierarchy Graph is as shown in FIG. 2.

Figure 2:
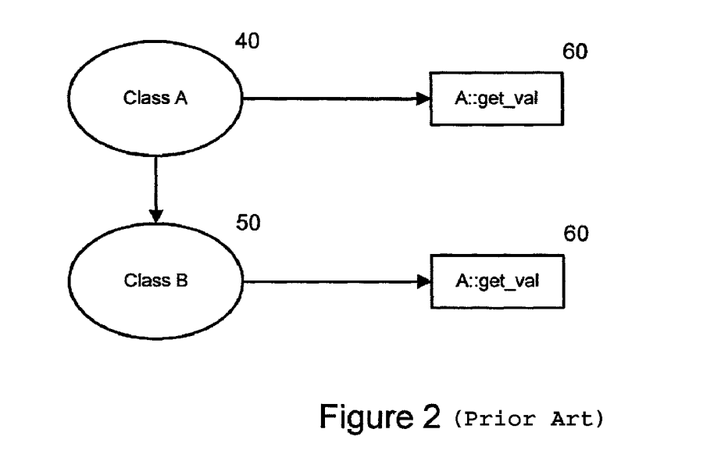
FIG. 2 illustrates a class hierarchy graph corresponding to the program code shown in Listing 1, in which a function in the base class is not overriden in the subclass.

FIG. 2 shows that both classes A 40 and B 50 access the same get_val function, A::get_val 60, as get_val( ) defined in class A is not overridden in class B.

Building the Class Hierarchy Graph is straightforward when all the class definitions are visible in a single file. The situation becomes more complicated when the derived classes and the base classes are in different files and the Class Hierarchy Graph needs to be constructed. In such cases, the compiler usually depends on a feature whereby all the compilation units are visible, for example, under the option -ipo for Intel and HP compilers or +O4 or +Owhole_program_mode for many other compilers. Listing 2 is an example to illustrate this point. Class A is defined in file f1.C, while the derived class B is in f2.C. In addition, f1.C defines a function DoSomething( ) that takes a parameter that is a pointer to an object of type A.

Listing 2.

```
#include "f1.H"
int DoSomething( A *pa) {
    // Cannot replace get_val with A::get_val
    DoSomethingElse(pa->get_val( ));
}
        <file f1.C>
#include "f1.H"
class B: public A {
    int j;
public:
    B( ): j(0) { };
    ~B( ) { };
    virtual int get_val( ) { return j+2; };
};
        <file f2.C>
class A {
    int i;
public:
    A( ): i(0) { };
    ~A( ) { };
    virtual int get_val( ) { return i; };
};
        < file f1.H>
```

Class B in file f2.C overrides the function get_val( ) defined in class A of f1.C. Hence, the Class Hierarchy Graph of FIG. 1 would change to the one in FIG. 3. In this case, Class A 40 and Class B 50 access different get_val( ) functions 62, 64 respectively.

Figure 3:
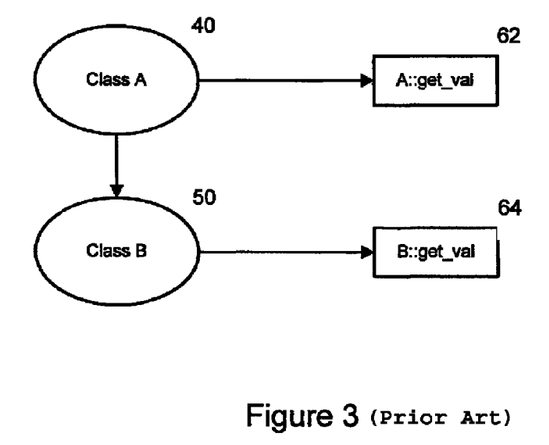
FIG. 3 illustrates a class hierarchy graph corresponding to the program code shown in Listing 2, in which a function in the base class is overriden in the subclass.

It would now be impossible (statically) to infer from the Class Hierarchy Graph that the call to pa→get_val( ) in DoSomething( ) can be replaced by pa→A::get_val( ). This is because a call to DoSomething( ) can pass either objects of type A 40 or of type B 50 to the function as actual parameters. If an object of type B 50 is passed, replacing the virtual call by a call to A::get_val( ) will result in incorrect code.

SUMMARY OF THE INVENTION

The present invention aims to address the above problem.

According to the invention, there is provided a method of producing class hierarchy information for function devirtualization of a program that includes a plurality of classes, from a representation of the program that includes virtual tables for classes that include virtual functions and type structure information for the classes, the method comprising identifying the classes from the virtual tables and using the type structure information to identify the relationships between the classes.

The class hierarchy information for building a class hierarchy graph cannot be extracted from the virtual tables by themselves, as these do not include the superclass-subclass relationship information. However, by using the type structure information, which is for example generated to support run time type identification (RTTI), the subclass-superclass information can be extracted.

According to the invention, there is further provided an optimiser for producing class hierarchy information for use in function devirtualization of a program that includes a plurality of classes, from a representation of the program that includes virtual tables for classes that include virtual functions and type structure information for the classes, the optimiser being arranged to identify the classes from the virtual tables and to use the type structure information to identify the relationships between the classes.

The class hierarchy graph showing the relationship between all the classes that are associated with virtual functions can be captured late in the compilation phase from the intermediate representation generated by the compiler front end. The intermediate representation contains RTTI information that is generated by C++ compiler front ends to support various C++ calls. The RTTI information provides baseclass information for the virtual tables corresponding to classes that use virtual functions.

As available compiler front ends already provide RTTI information, the compiler front end does not need to provide additional information to perform function devirtualization.

By analysing which subclasses override baseclass functions, a decision can be made as to whether a function is devirtualizable.

According to the invention, there is further provided apparatus for producing class hierarchy information for use in function devirtualization of a program that includes a plurality of classes, from a representation of the program that includes virtual tables for classes that include virtual functions and type structure information for the classes, the apparatus comprising means for identifying the classes from the virtual tables and means for using the type structure information to identify the relationships between the classes.

According to the invention, there is still further provided program code, stored in a computer-readable storage medium, which when executed on a computer is arranged to provide class hierarchy information for use in function devirtualization of an object-oriented program from a representation of the program that includes virtual tables for classes that include virtual functions and RTTI information associated with the program, the program code being arranged to identify the classes from the virtual tables and to use the RTTI information to identify the relationships between the classes.

DETAILED DESCRIPTION

Figure 4:
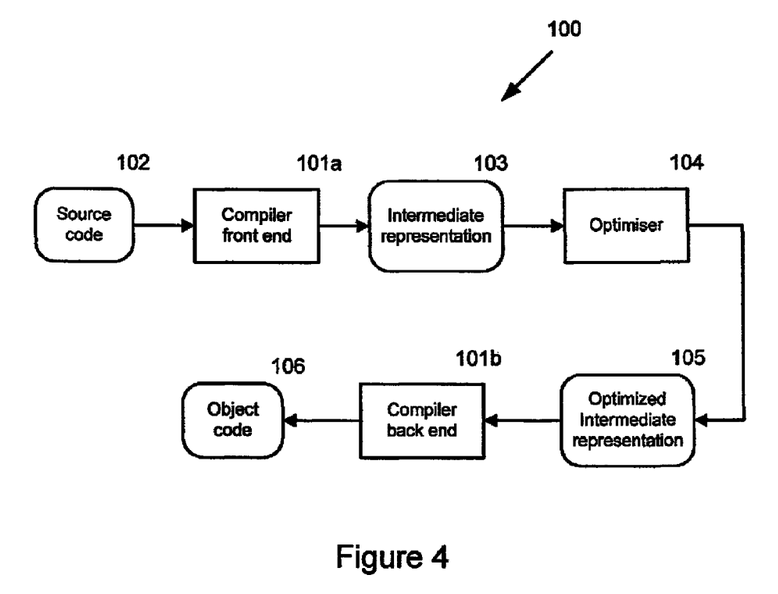
FIG. 4 is a schematic diagram of a system according to an embodiment of the invention in which an optimiser receives virtual table and type structure information from a compiler front end.

FIG. 4 is a schematic diagram of a system 100 according to one embodiment of the invention. A compiler 101*a*, 101*b* is logically divided into two parts, a compiler front end 101*a* and a compiler back end 101*b*. The compiler front end 101*a* receives as input a computer program source code 102, for example a collection of files comprising a C++ program.

In this example, the compiler is, for example, the HP aCC compiler, which is part of the HP aC++ compiler product.

The compiler front end 101*a* is responsible for the language processing of computer programs, such as scanning, parsing, and semantic analysis. Following the completion of all language processing, the compiler front end 101*a* translates the computer program source code 102 into a compiler intermediate representation 103. The compiler intermediate representation 103 is written in a compiler intermediate language, such as Pcode or Ucode. The aCC compiler generates a version of Ucode referred to as Ucode-1.

The intermediate representation is fed into an optimiser 104 that performs a variety of code optimisations, many of which are well known in the art, to generate optimised intermediate code 105.

The compiler back end 101*b* receives as input the optimised compiler intermediate representation 105 and generates object code 106 for a target computer platform. The target computer platform is the computer platform where the compiler back end 101*b* resides. The object code 106 is written in a particular machine language of the target computer platform.

Figure 5:
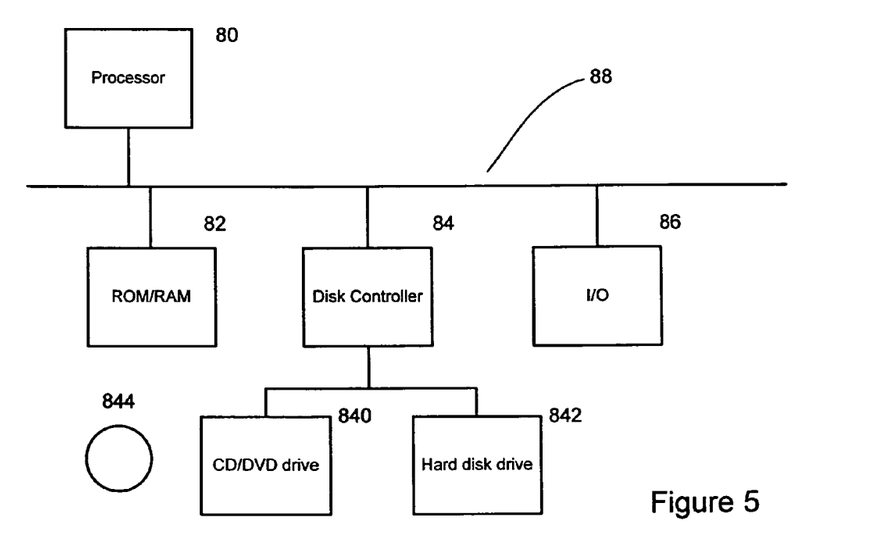
FIG. 5 is a schematic diagram of a computer system suitable for running the compiler and optimiser shown in FIG. 4.

FIG. 5 is a schematic diagram of a computer system on which the compiler and optimiser programs of FIG. 4 can be executed.

Referring to FIG. 5, the computer is for example a workstation computer running suitable operating system software such as the HP-UX operating system. It has a processor 80, ROM and RAM memory 82, a disk controller 84 and an I/O module 86 interconnected by a bus 88. The disk controller 84 is connected to a hard disk drive 840 on which the compiler and optimiser programs can be stored, and an optical drive 842 for receiving an optical disk 844, for example storing a program to be compiled. The I/O module 86 interfaces to a variety of input/output components and systems including a display, keyboard and mouse (not shown) as well as to network, USB and other interfaces (not shown). The skilled person would readily understand that above description is illustrative only and that many types of computer system are well known.

Referring again to FIG. 4, the compiler front end 101*a* does not generate any specific information to encode the class hierarchy. However, in common with most C++ compilers, the aCC compiler supports a concept known as Run Time Type Information/Identification (RTTI). This is a mechanism that allows the type of an object to be determined during program execution. To aid RTTI, the compiler front end 101*a* generates the type structure of the classes that make use of virtual function calls. This information is encoded in the intermediate code 103 generated by the front end 101*a*.

The intermediate code 103 therefore includes a virtual table (vtable) data structure for each class in the code, together with the typeid information. For example, the vtable, typeid and baseclass structure for Listing 2 shown above is shown in FIG. 6.

Virtual table (vtable) pointers are the first fields of objects that make use of virtual functions. They point to static vtable structures created by the compiler front end for each class, although there may be multiple vtable static structures for multiple/virtual inheritance. Whenever a class declares a virtual function or is derived from a class that declares a virtual function, the compiler adds a pointer to the virtual table, which is itself an array of pointers to the virtual functions.

Figure 6:
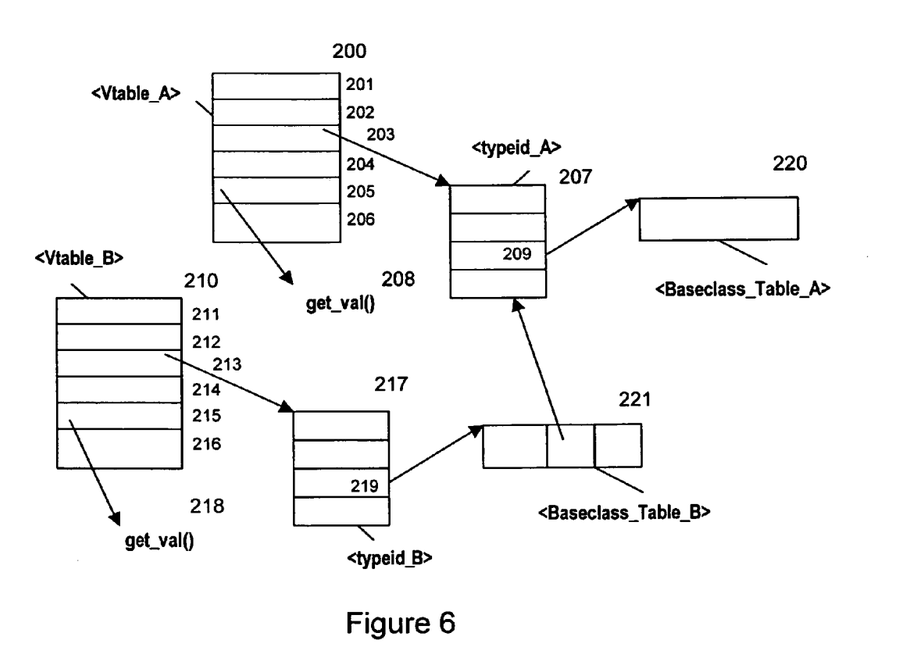
FIG. 6 is a pictorial representation of the intermediate data structure corresponding to the program code shown in Listing 2 according to an embodiment of the invention.

For the class A of the example Listing 2, the compiler creates a static vtable data structure 200 named, for example, <Vtable_A>. The Vtable structure 200 comprises 6 fields 201-206. In this example, the first and second fields 201, 202 and fourth and sixth fields 204, 206 are not of interest for constructing the class hierarchy graph. The third field 203 is a pointer that points to a typeid structure 207, for example named <typeid_A>. The fifth field 205 points to the virtual function get_val( ) 208.

The Vtable for class B is similar, having a static structure 210 named, for example, <Vtable_B>. The Vtable_B structure 210 comprises 6 fields 211-216. The first, second, fourth and sixth fields 211, 212, 214, 216 are again not of interest. The third field 213 is a pointer that points to a typeid structure 217, for example named <typeid_B>. The fifth field 215 points to the get_val( ) function 218 of class B, as opposed to class A.

By checking the vtable static variables (of the kind <Vtable_A>) that are created, the names of the classes, as well as the names of the virtual functions that are accessible from the virtual table, can be inferred. Hence, the nodes as defined in FIG. 3 and the lists of virtual functions that are accessible can be constructed. But the edges between the nodes cannot be inserted by inspecting the vtable static variables. This is because the superclass-subclass information is absent in the vtable i.e. the vtable does not show the relationship between classes A and B. For this purpose, the typeid structures that are created for each class and which the respective vtables point to, need to be inspected.

The typeid structure encapsulates the type information of the class and is used for C++ calls such as dynamic_cast, typeid and so on. This can be exploited to extract the superclass-subclass hierarchy. As is shown in FIG. 6, the typeid structure for each class includes a field 209, 219 that points to a baseclass table. The baseclass table is an array of pointers pointing to the typeid structures of the superclasses (base classes) of the class in question.

So the third field 209 of the typeid structure for class A, <typeid_A> 207, points to an empty baseclass table 220, named for example <Baseclass_Table_A>. The baseclass table 221 of class B, named for example <Baseclass_Table_B>, points to the typeid structure 207 of class A. This arrangement implies that A is the baseclass/superclass of B, while A is not derived from any other class. The edge between node A and node B shown in FIG. 3 can now be constructed from this information.

The optimiser 104 includes an algorithm, shown below in Listing 3 and named BuildCHG( ), for creating a class hierarchy graph.

Listing 3.

```
BuildCHG( ) {
    for each vtable(v) created in a file do {
        create a node (n) for v if non-existent ;
        add the virtual functions (f) accessible via v to n;
        let t = typeid of v;
        for each baseclass (b) of t do {
            find the CHG node(n_b) corresponding to b ;
            add n_b as a baseclass of n ;
            add n as a subclass of n_b ;
        }
    }
}
```

Figure 7:
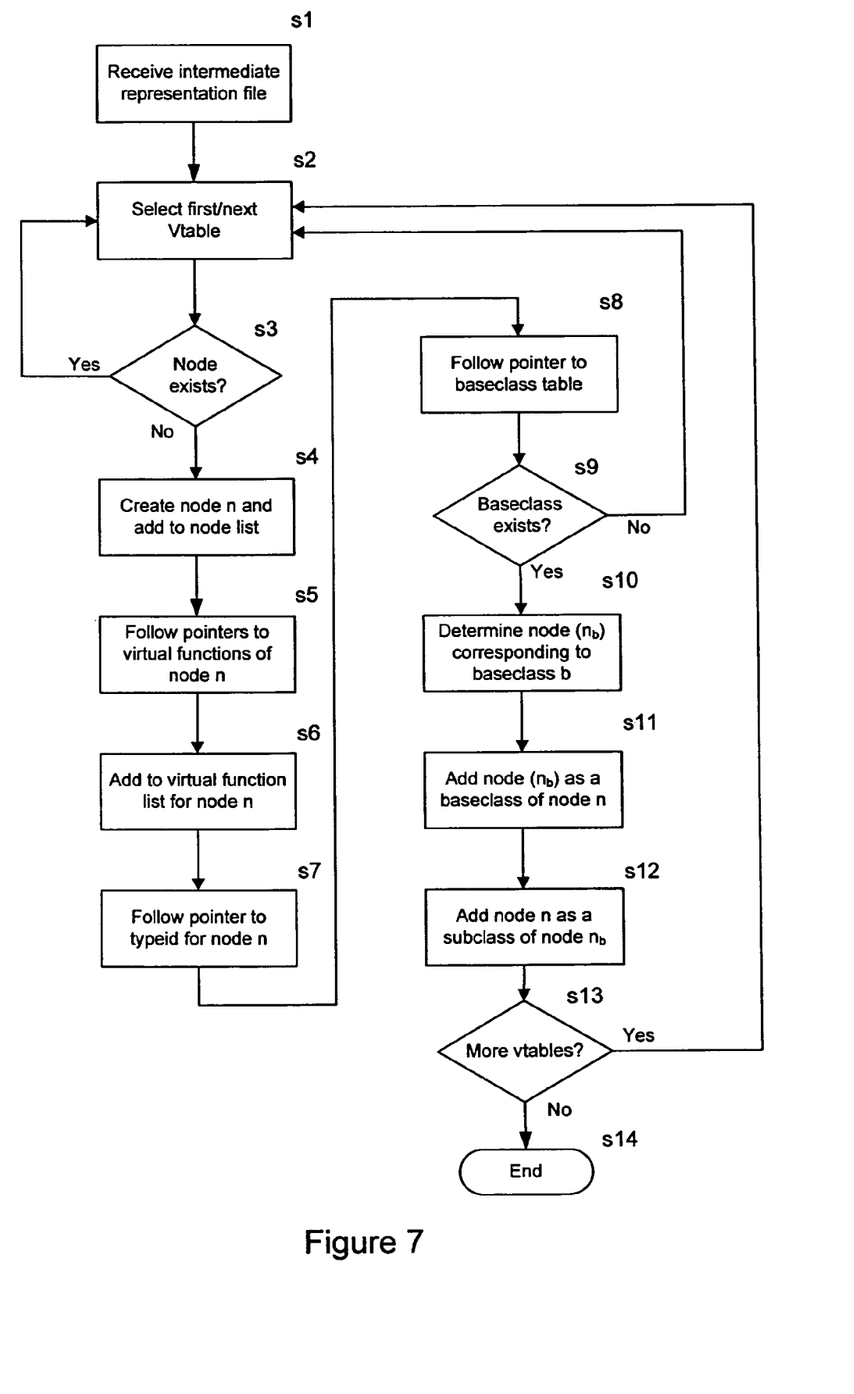
FIG. 7 is a flow diagram illustrating the operation of the system according to an embodiment of the invention.

The operation of the optimiser 104 in constructing a class hierarchy graph for a general C++ program will now be described in detail with reference to FIG. 7.

The optimiser 104 receives a file containing the intermediate representation code 103 including the vtable, typeid and baseclass information (step s1). It selects the first vtable (step s2), and determines whether a node (n) exists (step s3). If not, it creates a node n and adds this to the node list (step s4). It then determines the virtual functions that are accessible from the vtable by following the pointers to the virtual functions (step s5). These functions are added to a list of virtual functions held for the node n (step s6). The optimiser program then looks at the typeid structure pointed to by the vtable (step s7) and looks at the corresponding baseclass table (step s8). If a baseclass exists (step s9), the optimiser 104 finds the node $n_b$ that corresponds to the baseclass (step s10). It then adds the node $n_b$ as the baseclass of the node n (step s11) and adds the node n as a subclass of the node $n_b$ (step s12). If there are no more vtables (step s13), the process ends (step s14), otherwise this sequence of steps (s2-s12) is repeated for each vtable.

Although the examples up to now have demonstrated single inheritance only, certain object-oriented languages, including C++, permit multiple inheritance. In this case, multiple vtables are created for the same class. A multiple inheritance example is shown in Listing 4 below.

Listing 4.

```
class A {
    int i;
    public:
    A( ):i(0) { };
    ~A( ) { };
    virtual int get_val( ) {return i;};
};
class B {
    int j;
    public:
    B( ):j(45) { };
    ~B( ) { };
    virtual int get_val( ) { return j;};
};
class C: public A, public B {
    int k;
    public:
    C( ):k(76) { };
    ~C( ) { };
    virtual int get_val( ) { return k; };
}
int foo(void)
{
    C c, *pc;
    pc = &c;
    return pc->get_val( );
}
```

In this example, class C is derived from both classes A and B, as indicated by the declaration 'class C: public A, public B { . . . }'.

Figure 8:
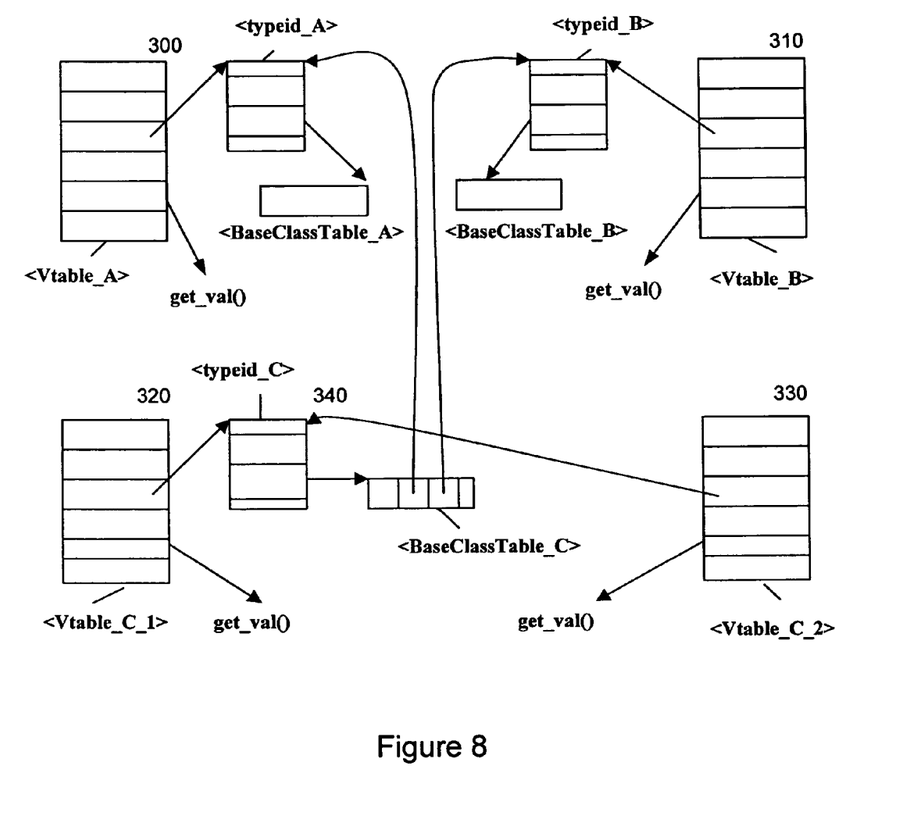
FIG. 8 is a pictorial representation of the intermediate data structure corresponding to the program code shown in Listing 4 according to an embodiment of the invention.

The corresponding vtable, typeid and baseclass structure is illustrated in FIG. 8. There are vtables shown, <Vtable_A> 300 for class A, <Vtable_B> 310 for class B and <Vtable_C1> 320 and <Vtable_C2> 330 for class C. However the typeid structure <typeid_C> 340 is shared by both of the class C vtables 320, 330. If a node is created for each vtable following the BuildCHG( ) algorithm set out above and explained fully in FIG. 7, then the resulting Class Hierarchy Graph will have two nodes for Class C, each node indicating that it is derived from both Class A and Class B. This is wasteful, as both these nodes carry similar information. Therefore, a modification to the procedure of FIG. 7 can be performed to merge the redundant nodes.

Figure 9:
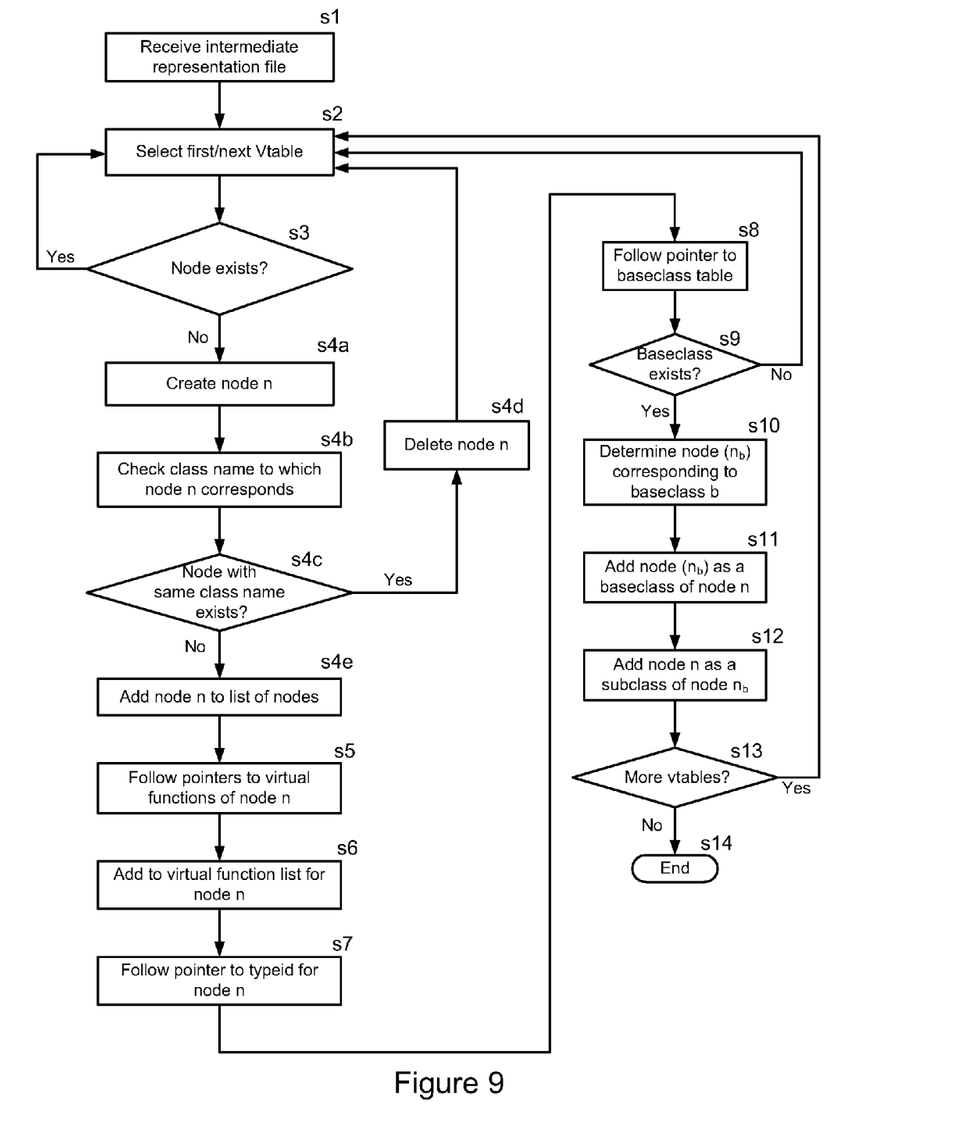
FIG. 9 is a flow diagram illustrating a modification to the flow diagram of FIG. 7 for merging redundant nodes in the multiple/virtual inheritance situation, as shown for example in FIG. 8.

FIG. 9 illustrates one way of merging the nodes. Steps s1 to s3 and s5 to s14 are the same as in FIG. 7. Step s4 is replaced by steps s4a-s4e. The node n is first created (step s4a). The optimiser then checks the class name to which the node n corresponds (step s4b) by simple comparison of strings on the class names that are stored in the nodes. If a node with the same class name exists (step s4c), the program deletes node n (step s4d) and returns to look at the next node (step s2). Otherwise, node n is added to the list of nodes (step s4e) and the program continues as before (step s5).

It will be appreciated by the skilled person that while the construction of the class hierarchy graph has been described as the function of an optimiser module, this function could be integrated into the compiler front end.

It will also be appreciated that while the examples primarily relate to C++, the invention may be applied to other object-oriented languages that use virtual functions in a similar way.

It will further be appreciated that the technique for constructing the class hierarchy graph from the intermediate representation can be extended to capture the graph from a program executable. This is useful for compilers that carry out post link optimisations. For example, program executables contain code and data needed for program execution, which includes the Vtables, typeid and baseclass tables. Tools are available, specific to executable code, that can read and decode executable code and can lay out the structure of its Vtables and the associated RTTI information. The rest of the process of constructing the CHG is similar to the method described above.

The above description of embodiments of the invention has been presented for purposes of illustration and description. It is not intended to be exhaustive or to limit the invention to the embodiments disclosed, and modifications and variations are possible in light of the above teachings or may be acquired from practice of the invention. The embodiments were chosen to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The invention claimed is:

1. A method of providing class hierarchy information for function devirtualization of a program that includes a plurality of classes, the plurality of classes having virtual functions, the method comprising:

identifying a plurality of nodes from virtual tables in an intermediate representation of the program generated by a compiler front end in a compiler in a computer system, wherein the intermediate representation of the program includes virtual tables and type structure information of each of the plurality of classes, and wherein identifying a plurality of nodes from virtual tables comprises:

creating a node for each virtual table in the intermediate representation;

determining a class name of the created node for each virtual table;

if a node corresponding to the class name does exist in the plurality of nodes, deleting the created node from the class hierarchy information; and if a node corresponding to the class name does not exist in the plurality of nodes, adding the created node to the plurality of nodes in the class hierarchy information;

identifying relationships between the plurality of nodes using the type structure information in the intermediate representation of the program by the compiler front end, wherein identifying relationships between the plurality of nodes comprises:

identifying list of virtual functions from virtual table of a node;

identifying a baseclass by following pointers of each of the virtual functions to the type structure information;

if the baseclass is identified in the type structure information, determining a node corresponding to the identified baseclass and defining a superclass-subclass relationship between the determined node and the node; and if the baseclass is not identified in the type structure information, repeating identifying list of virtual functions, identifying a baseclass, and determining node corresponding to the identified baseclass and defining a superclass-subclass for all other nodes in the plurality of nodes; and creating the class hierarchy information by the compiler front end in the compiler based on the identified plurality of nodes and the identified relationships between the plurality of nodes, wherein the class hierarchy information includes nodes corresponding to the identified plurality of nodes and edges corresponding to the identified relationships between the plurality of nodes.

2. A method according to claim 1, wherein each of the edges comprises superclass-subclass relationship between two of the nodes.

3. A method according to claim 1, wherein the virtual tables and the type structure information are encoded in a program executable.

4. A method according to claim 3, further comprising decoding executable code in the program executable to determine the virtual table and type structure information.

5. A method according to claim 1, wherein the type structure information is generated to support run time type identification (RTTI).

6. A method according to claim 1, wherein the program is written in the C++ computer language.

7. The method of claim 1, further comprising: generating optimized intermediate representation of the program from the class hierarchy information for a target computer platform using a compiler back end in the compiler.

8. An optimiser in a computer system for producing class hierarchy information for use in function devirtualization of a program that includes a plurality of classes, the plurality of classes having virtual functions, the optimiser being arranged to receive an intermediate representation of the program from a compiler front end in a compiler in the computer system, wherein the intermediate representation of the program includes virtual tables and type structure information for each of the plurality of classes, to identify a plurality of nodes from the virtual tables in the intermediate representation of the program, wherein to identify a plurality of nodes comprises: to create a node for each virtual table in the intermediate representation, to determine a class name of the created node, to delete the created node if a node corresponding to the class name does exist in the plurality of nodes, and to add the created node to the plurality of nodes in the class hierarchy information if a node corresponding to the class name does not exist in the list of nodes, to identify relationships between the plurality of nodes from the type structure information in the intermediate representation of the program, wherein to identify relationships between the plurality of nodes comprises: to identify list of virtual functions from virtual table of a node, to identify a baseclass by following pointers of each virtual functions to the type structure information, to determine node corresponding to the identified baseclass and define a superclass-subclass relationship between the determined node and the node, and to repeat to identify list of virtual functions, identify a baseclass, and determine node corresponding to the identified baseclass and define a superclass-subclass for all other nodes in the plurality of nodes if the baseclass is not identified in the type structure information, and to create a class hierarchy information, the class hierarchy information includes nodes corresponding to each of the identified plurality of nodes and edges corresponding to the identified relationships between the plurality of nodes.

9. An optimiser according to claim 8, wherein the compiler front end is arranged to generate the type structure information to support run time type identification (RTTI).

10. Apparatus in a computer system producing class hierarchy information for use in function devirtualization of a program that includes a plurality of classes, the plurality of classes having virtual functions, the apparatus comprising:

means for identifying a plurality of nodes from virtual tables in an intermediate representation of the program generated by a compiler front end in a compiler, wherein the intermediate representation of the program includes virtual tables and type structure information of each of the plurality of classes, and wherein means for identifying the plurality of nodes comprises:

means for creating a node for each virtual table in the intermediate representation;

means for determining a class name of the created node for each virtual table;

if a node corresponding to the class name does exist in the plurality of nodes, means for deleting the created node from the class hierarchy information; and if a node corresponding to the class name does not exist in the plurality of nodes, means for adding the created node to the plurality of nodes in the class hierarchy information;

means for identifying relationships between the plurality of nodes using the type structure information in the intermediate representation of the program, wherein means for identifying relationships between the plurality of nodes comprises:

means for identifying list of virtual functions from virtual table of a node;

means for identifying a baseclass by following pointers of each of the virtual functions to the type structure information;

if the baseclass is identified in the type structure information, means for determining a node corresponding to the identified baseclass and defining a superclass-subclass relationship between the determined node and the node; and if the baseclass is not identified in the type structure information, means for repeating identifying list of virtual functions, identifying a baseclass, and determining node corresponding to the identified baseclass and defining a superclass-subclass for all other nodes in the plurality of nodes; and means for creating the class hierarchy information by in the compiler based on the identified plurality of nodes and the identified relationships between the plurality of nodes, wherein the class hierarchy information includes nodes corresponding to the identified plurality of nodes and edges corresponding to the identified relationships between the plurality of nodes.

11. A non-transitory computer-readable storage medium having instructions that, when executed by a computer, result in execution of a method to provide class hierarchy information for use in function devirtualization of a program that includes a plurality of classes, the plurality of classes having virtual functions, the method comprising:

identifying a plurality of nodes from virtual tables in an intermediate representation of the program generated by a compiler front end in a compiler in a computer system, wherein the intermediate representation of the program includes virtual tables and type structure information of each of the plurality of classes, and wherein identifying a plurality of nodes from virtual tables comprises:

creating a node for each virtual table in the intermediate representation;

determining a class name of the created node for each virtual table;

if a node corresponding to the class name does exist in the plurality of nodes, deleting the created node from the class hierarchy information; and if a node corresponding to the class name does not exist in the plurality of nodes, adding the created node to the plurality of nodes in the class hierarchy information;

identifying relationships between the plurality of nodes using the type structure information in the intermediate representation of the program by the compiler front end, wherein identifying relationships between the plurality of nodes comprises:

identifying list of virtual functions from virtual table of a node;

identifying a baseclass by following pointers of each of the virtual functions to the type structure information;

if the baseclass is identified in the type structure information, determining a node corresponding to the identified baseclass and defining a superclass-subclass relationship between the determined node and the node; and if the baseclass is not identified in the type structure information, repeating identifying list of virtual functions, identifying a baseclass, and determining node corresponding to the identified baseclass and defining a superclass-subclass for all other nodes in the plurality of nodes; and creating the class hierarchy information by the compiler front end in the compiler based on the identified plurality of nodes and the identified relationships between the plurality of nodes, wherein the class hierarchy information includes nodes corresponding to the identified plurality of nodes and edges corresponding to the identified relationships between the plurality of nodes.

* * * * *